US007555751B1

(12) United States Patent
Abbavaram et al.

(10) Patent No.: US 7,555,751 B1
(45) Date of Patent: Jun. 30, 2009

(54) METHOD AND SYSTEM FOR PERFORMING A LIVE SYSTEM UPGRADE

(75) Inventors: Vinod Abbavaram, Buffalo Grove, IL (US); Prasoon Saurabh, Naperville, IL (US); Ashish Sardesai, Schaumburg, IL (US)

(73) Assignee: 3Com Corporation, Marlborough, MA (US)

( * ) Notice: Subject to any disclaimer, the term of this patent is extended or adjusted under 35 U.S.C. 154(b) by 1063 days.

(21) Appl. No.: 10/916,070

(22) Filed: Aug. 11, 2004

(51) Int. Cl.
*G06F 9/44* (2006.01)
(52) U.S. Cl. ...................................................... 717/168
(58) Field of Classification Search ......... 370/216–221, 370/241, 242–245, 250; 709/248–250; 707/201–204; 717/168–173
See application file for complete search history.

(56) References Cited

U.S. PATENT DOCUMENTS

| 5,155,837 | A | * | 10/1992 | Liu et al. | 709/221 |
| 5,996,001 | A | * | 11/1999 | Quarles et al. | 709/203 |
| 6,157,932 | A | * | 12/2000 | Klein et al. | 707/204 |
| 6,684,396 | B1 | * | 1/2004 | Brittain et al. | 717/168 |
| 6,934,805 | B2 | * | 8/2005 | Hickman et al. | 711/114 |
| 7,379,419 | B2 | * | 5/2008 | Collins | 370/217 |

* cited by examiner

*Primary Examiner*—Dmitry Levitan
(74) *Attorney, Agent, or Firm*—McDonnell Boehnen Hulbert & Berghoff LLP

(57) ABSTRACT

The present invention presents a method and system for upgrading a live system. With the benefits of this invention a live system can be upgraded to a new version and then tested without significant downtime. If the upgrade fails the system can continue to run on a backed-up environment until the upgraded components are fixed, or the system can be rolled back to its original version.

22 Claims, 8 Drawing Sheets

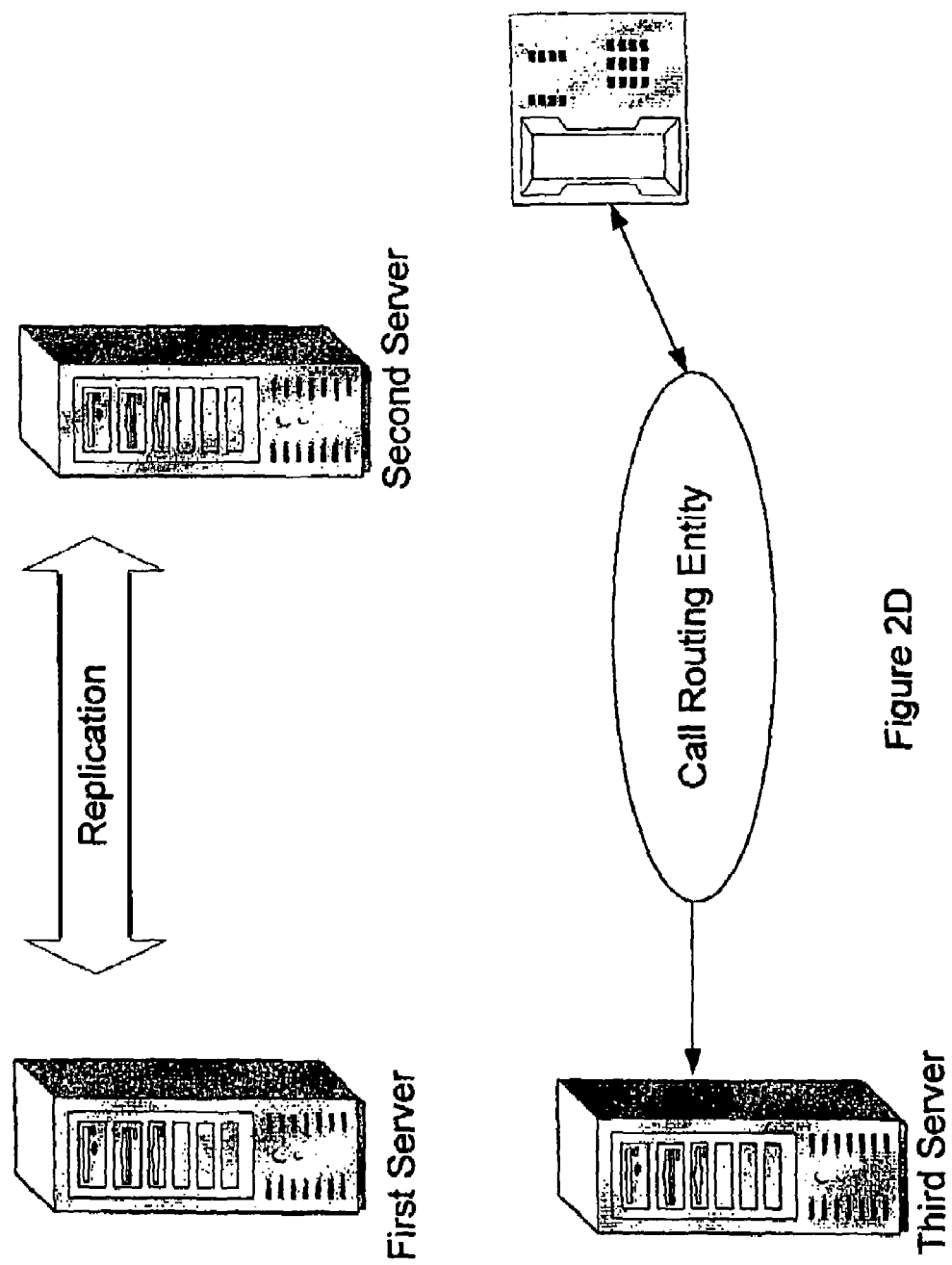

METHOD AND SYSTEM FOR PERFORMING A LIVE SYSTEM UPGRADE

FIELD OF INVENTION

The present invention relates to computer systems, and more particularly to a method for upgrading live computer systems.

BACKGROUND

Currently, many computer systems are built to support user sessions around the clock. Such systems will often run various programs and applications that require periodic patches or upgrades. Because most programs and applications have various version upgrades and patches, a system administrator will usually upgrade the system when a new version or patch becomes available in order to assure that the system runs smoothly and efficiently.

A typical system upgrade requires that the system be brought down or taken off line for a considerable amount of time. Then, the system is upgraded and tested, and after a successful test it is brought back online. For systems that are live, this downtime may be extensive and therefore cause user frustration and disappointment.

Additionally, an upgrade itself may turn out to be unsuccessful. And, a failed upgrade may even prolong the system's downtime. As a result of an unsuccessful upgrade, the old version of a system would need to be restored and data would need to be rescued and reconciled. Sometimes, data may be inadequately rescued or some of it may not be rescued at all, and the system will thus run on obsolete data. Using obsolete data may lead to further system errors and end-user frustration and disappointment.

The present methods for upgrading a system are, therefore, inadequate. It would be desirable to lessen the downtime associated with upgrading a system. It would also be desirable to bring back and restore a previous version of a system or program without unnecessary downtime. It is further desirable to sufficiently test the upgraded version of a system before resuming critical applications, thereby again extending the downtime of the system.

Therefore, there exists a need for an improved method and system for upgrading live systems.

SUMMARY

With the benefits of this invention a live production system can be upgraded to a new version without significant downtime. Further, if the upgrade fails a system administrator can continue to run the system on the backed-up environment until the upgraded system components are fixed or rolled back to the original version. Still further, an administrator may be able to take a sufficient amount of time to test and qualify the upgraded system before bringing it back online.

Thus, in one respect, an embodiment of the present invention may take the form of a method comprising the steps of (i) terminating user access to a first server and a second server, (ii) importing data from the first server to a third server, wherein the first server and the third server are of the same version, wherein a replication application is maintained between the first server and the second server, and wherein a call routing entity is in communication with the first server and the second server, (iii) engaging the call routing entity in communication with the third server, and terminating the communication of the call routing entity with the second server and the first server, then (iv) upgrading the first server and the second server, (v) importing data from the third server into the first server, and finally (vi) engaging the call routing entity in communication with the first server and the second server, and terminating the communication of the call routing entity with the third server.

In another respect, the exemplary embodiment may take the form a method for upgrading a system, the method comprising the steps of (i) importing data from a first server to a third server, (ii) upgrading the first server and a second server while running the third server, wherein a replication application is maintained between the first server and the second server, and (iii) importing data from the third server to the first server.

In yet another respect, the exemplary embodiment may take the form of system that comprises (i) a first server in communication with a second server, wherein the first server is running a replication application and, wherein the second server contains the same data as the first server, (ii) a third server that the first server imports data into prior to being upgraded, wherein the third server receives system traffic and processes data while the first server is being upgraded, and (iii) a call routing entity that routs system traffic to a server.

These and other aspects and advantages will become apparent to those of ordinary skill in the art by reading the following detailed description, with reference where appropriate to the accompanying drawings. Further, it should be understood that the foregoing summary is merely exemplary and is not intended to limit the scope of the invention as claimed.

BRIEF DESCRIPTION OF THE DRAWINGS

An exemplary embodiment of the present invention is described herein with reference to the drawings, in which:

FIGS. 2A-2G are a series of block diagrams depicting exemplary step in the live upgrade process for the system of FIG. 1.

DETAILED DESCRIPTION OF AN EXEMPLARY EMBODIMENT

1. Exemplary System

Figure 1:
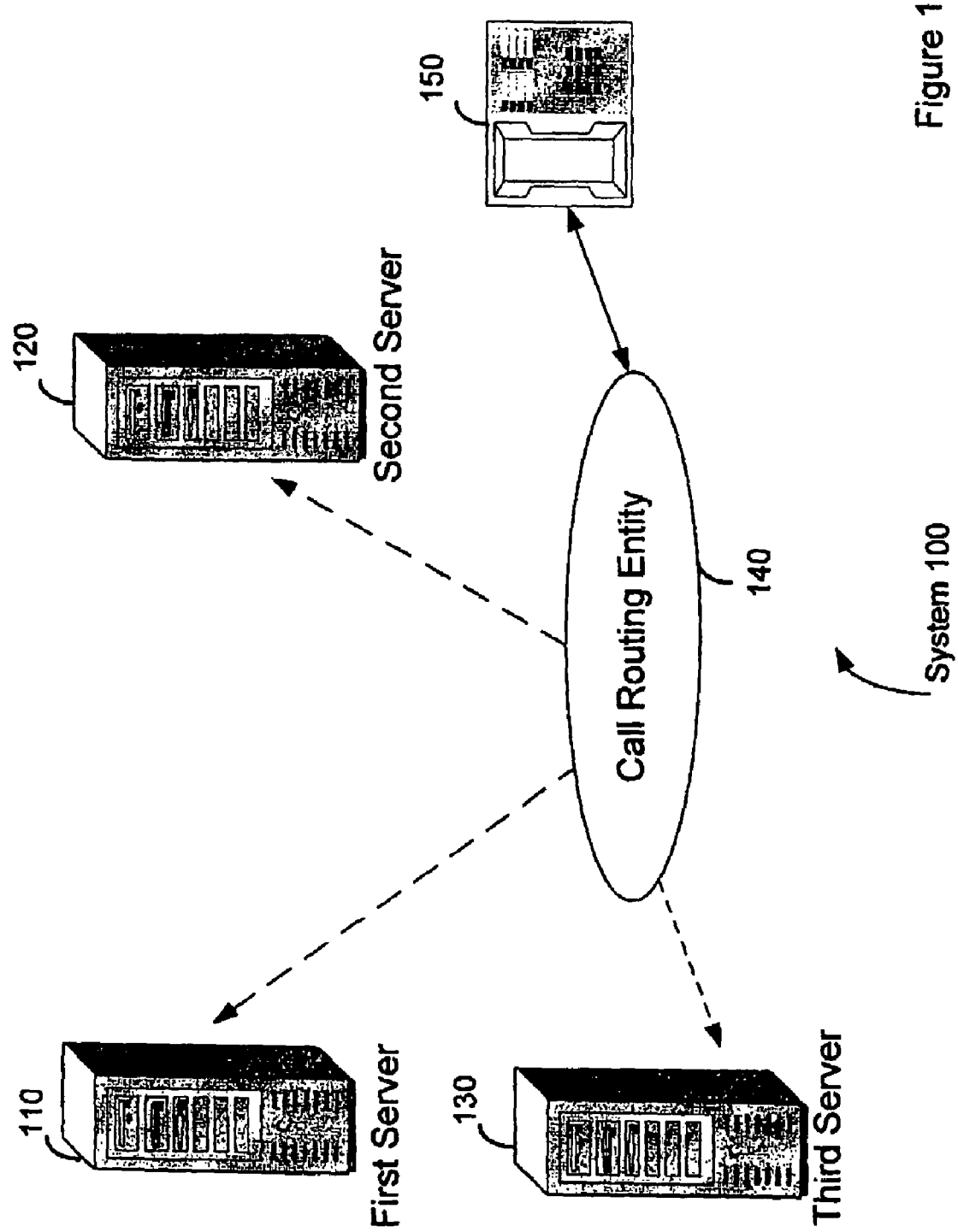
FIG. 1 is an exemplary system for performing a live upgrade.

FIG. 1 is an exemplary system for performing a live upgrade. In accordance with an exemplary embodiment, system 100 is a live call processing system, such as a virtual component exchange ("VCX"), but the principles discussed herein are not limited to call processing systems. Accordingly, a variety of other systems might alternatively be used. System 100 shows a first, second, and third server 110, 120, 130. Also illustrated as part of System 100 are a call routing entity 140 and a telephone 150. The first server 110, second server 120, and third server 130 can generate, process, and store data involved in processing calls. To that end, there may be various administrator and user applications running on the servers 110, 120, 130.

In accordance with the exemplary embodiment, the first server 110 is the main server at which the administration and user applications run. The second server 120 is a secondary server that is identical (or nearly identical) to the first server 110 at least in terms of the applications running on it and the data processed or stored at it. The third server 130 is a server generally used for the limited purpose of upgrading the first and second servers 110, 120; however, the third server 130 might perform other functions as well.

The call routing entity 140 is any entity that can route user calls. The call routing entity 140, may, for instance be a call agent. The call routing entity 140 routes calls based on an Internet Protocol ("IP") address specified in the call routing entity 140 or based on other criteria used to route calls. The call routing entity 140 may also route calls to more than one server. For example, the first server 110 may be designated as the primary server handling calls, and the IP address of the first server 110 may be stored in the call routing entity 140 as the primary call routing IP address. Accordingly, the call routing entity 140 may primarily route calls to the first server 110. If the first server 110 is not available, however, the call entity 140 could route the call to a backup server, such as the second server 120, and in this case the IP address of the second server 120 would be stored in the call routing entity 140 as the secondary call routing IP address.

Thus, the second server 120 may serve as a backup to the first server 110. In order to maintain seamless operation in the event of an interruption or other fault in the first server 110, the second server would generally need to have an identical copy of the current call data stored by the first server 110. In order to keep the second server 120 updated to date with the first server 110, a replication application may run on the first and/or second servers 110, 120. The replication application can continually send copies of the current data from the first server 110 to the second server 120, thereby allowing data at the first server 110 to be timely replicated at the second server 120.

System 100 also includes a telephone 150. The telephone 150 can be any kind of a telephone, such as an IP telephone, a cellular telephone, a land-line telephone or another type of telephone. The telephone 150 may even be a computer or a Personal Digital Assistant (PDA). The telephone 150 is communicatively connected to the call routing entity 140. And, while this figure only depicts a single telephone, the system might alternatively include a greater number of telephones. Where the system performs functions other than call processing, or even for some call processing applications, devices other than telephones might interface with the call entity 140.

2. Exemplary Process Flow

Figure 2A:
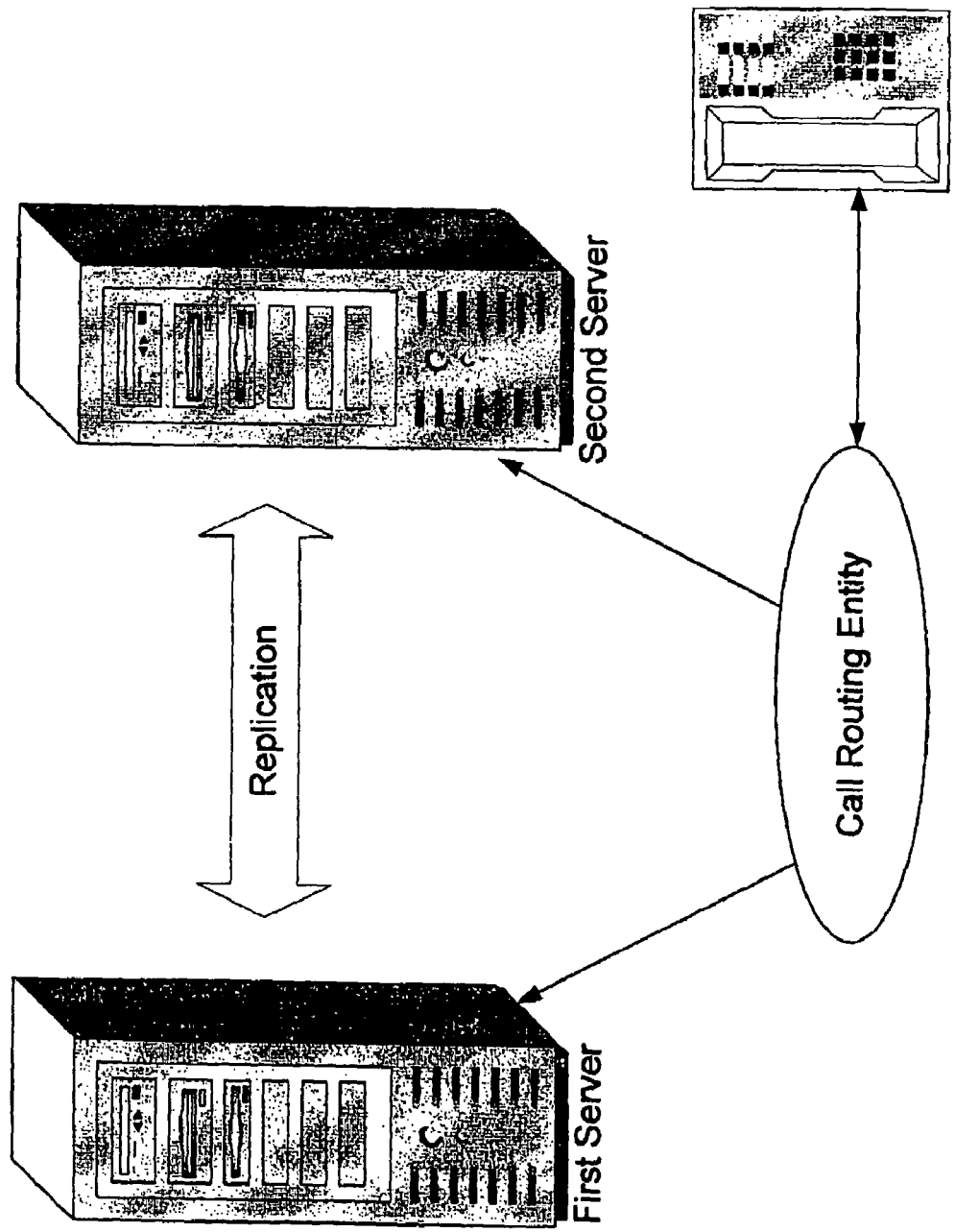

In accordance with the exemplary embodiment, the present invention can take the form of a method the steps of which are depicted in a series of block diagrams 2A-2G. FIG. 2A represents the system 100 at the first stage of the upgrade process. As previously described, the system includes the first server 110, the second server 120, the call routing entity 140 and a telephone 150 or other device that makes calls into the system. The servers may each include one or more different applications that are executing on the respectively servers. And, each server may also include one or more data stores, such as database, to store data used by the various applications executing on the servers.

To start the system upgrade, a system administrator may first stop the web-interface to the data stores on the first server 110. This can minimize data inconsistency that might otherwise result during the upgrade process. At this stage, the first server 110 operates as the primary server, and the call routing entity 140 routes incoming calls to the first server 110. In order to keep the second server 120 up-to-date in the event of an outage or other fault in the first server 110, the first server 110 replicates its data to the second server 120.

Figure 2B:
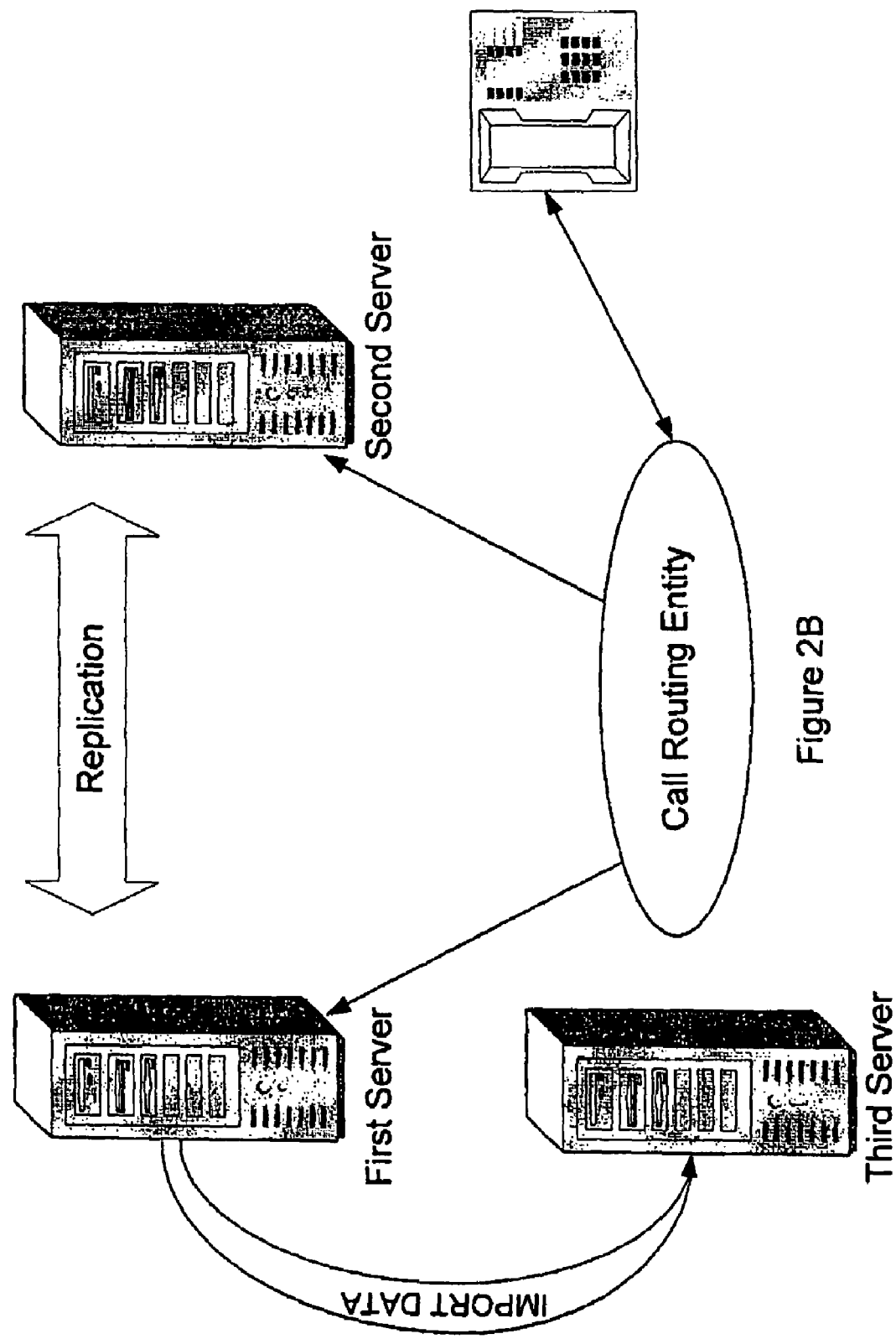

FIG. 2B represents the next step in the upgrade process. At this stage, the call routing entity 140 continues to route the calls to the first server 110. That is, the first server 110 continues to remain online at this stage of the upgrade. In addition to continuing to replicate its data to the second server 120, the first server imports its data to the third server 130, which acts as a backup system for the upgrade process. The third server 130 will generally run all the same call processing applications that are also running on the first and second servers 110, 120. Also, at this stage, the first, second, and third servers 110, 120, 130 are all running the same system version, version A, for instance.

Figure 2C:
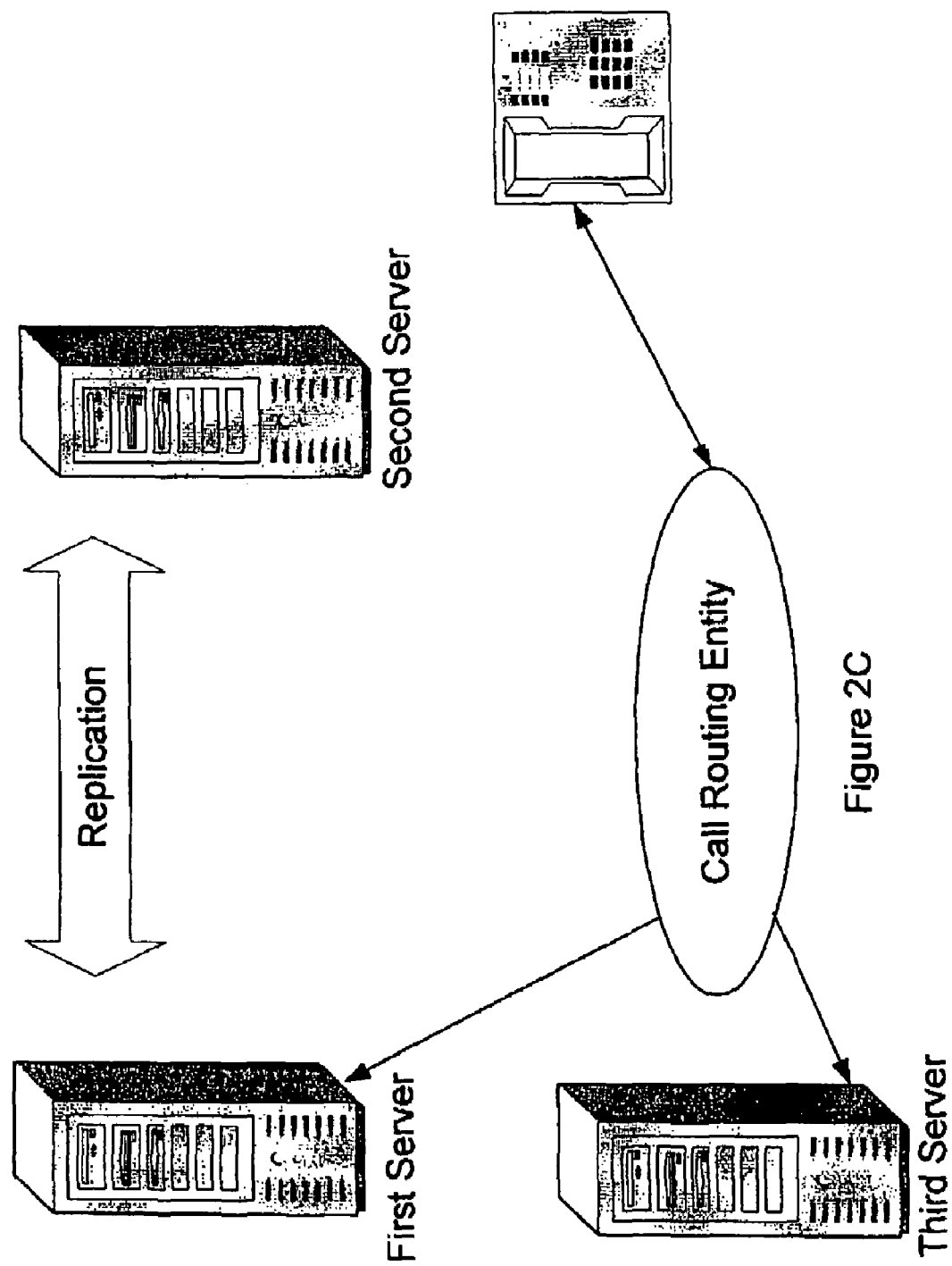

FIG. 2C illustrates the third stage in the upgrade process. At this stage, the call routing entity 140 maintains its connection with the first server 110, but instead of using the second server 120, its backup server, it now switches to using the third server 130 as the backup server. Thus, in the event of a failure of the first server 110, the call routing entity 140 would now route calls to the third server 130 as the backup server instead of the second server 120. Also, at this stage some script may now run on the third server 130 as the backup server. And, the call routing entity 140 may begin to perform some functions, although likely to a very limited extent, on the third server 130 as the backup server.

FIG. 2D illustrates the fourth step in the live upgrade process. At this stage, the call routing entity 140 totally switches to using the third server 130. Thus, the first and second servers 110, 120 are offline in this call processing system, and the primary and second IP addresses for the call processing system both point to the third server 130. Incoming calls to the call routing entity 140 are routed to the third server 130. In the event of a failure of the third server 130, there is no backup server and the entire call processing system would fail. However, it would be possible to add a fourth server to be a backup to the third server 130. In this embodiment, the primary call routing IP address would point to the third server 130 and the secondary call routing IP address would point to the fourth server.

Figure 2E:
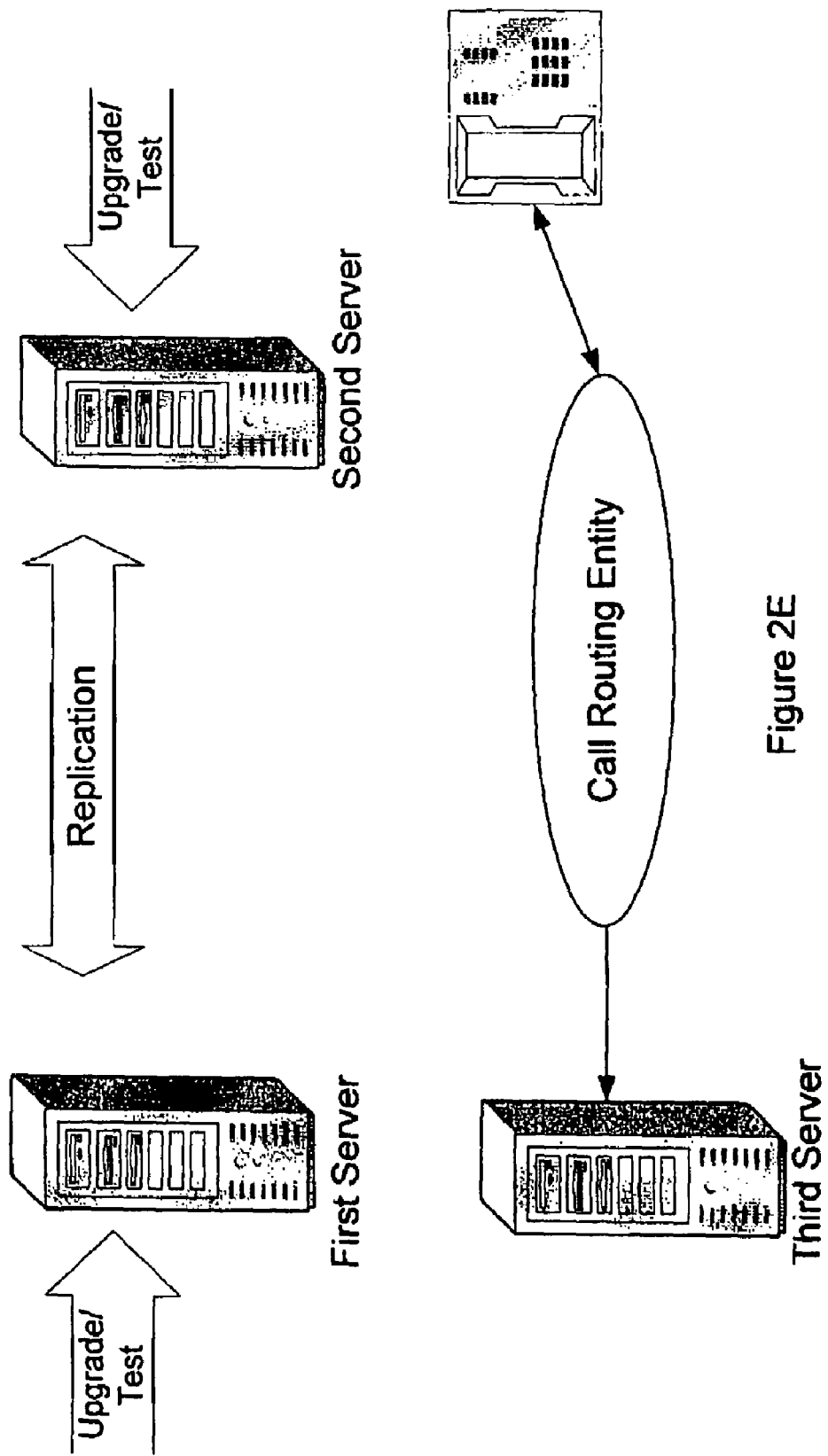

FIG. 2E illustrates system 100 as it is being upgraded to a new version of its software, version B for instance. First, all processes on the first and second servers 110, 120 are stopped. In accordance with the exemplary embodiment, it is preferable to next take a full back-up of the first and second servers 110, 120 before they are upgraded. In case of upgrade failure, a system administrator would then be able to quickly and efficiently restore the first and second servers 110, 120 to their pre-upgrade state. After the back-up, the first and second servers 110, 120 are upgraded. In a preferred embodiment, the first and second servers 110, 120 are upgraded independently; however, it is possible that the upgrade of one server might be dependent on the upgrade of the other server.

Once the upgrade is complete, the applications on the first and second servers 110, 120 may be restarted. The replication between the servers 110, 120 can additionally be restarted. However, in one alternate embodiment, the replication functions on the servers are restarted after the backup and therefore are running during the upgrade process. The system can additionally be tested after the upgrade to ensure that all applications are functioning properly. If there is a problem, the system administrator can work to fix the problem, and in the event that the problem cannot be fixed or repair takes too long, the system administrator can restore the system to its pre-upgrade state using the backup.

Figure 2F:
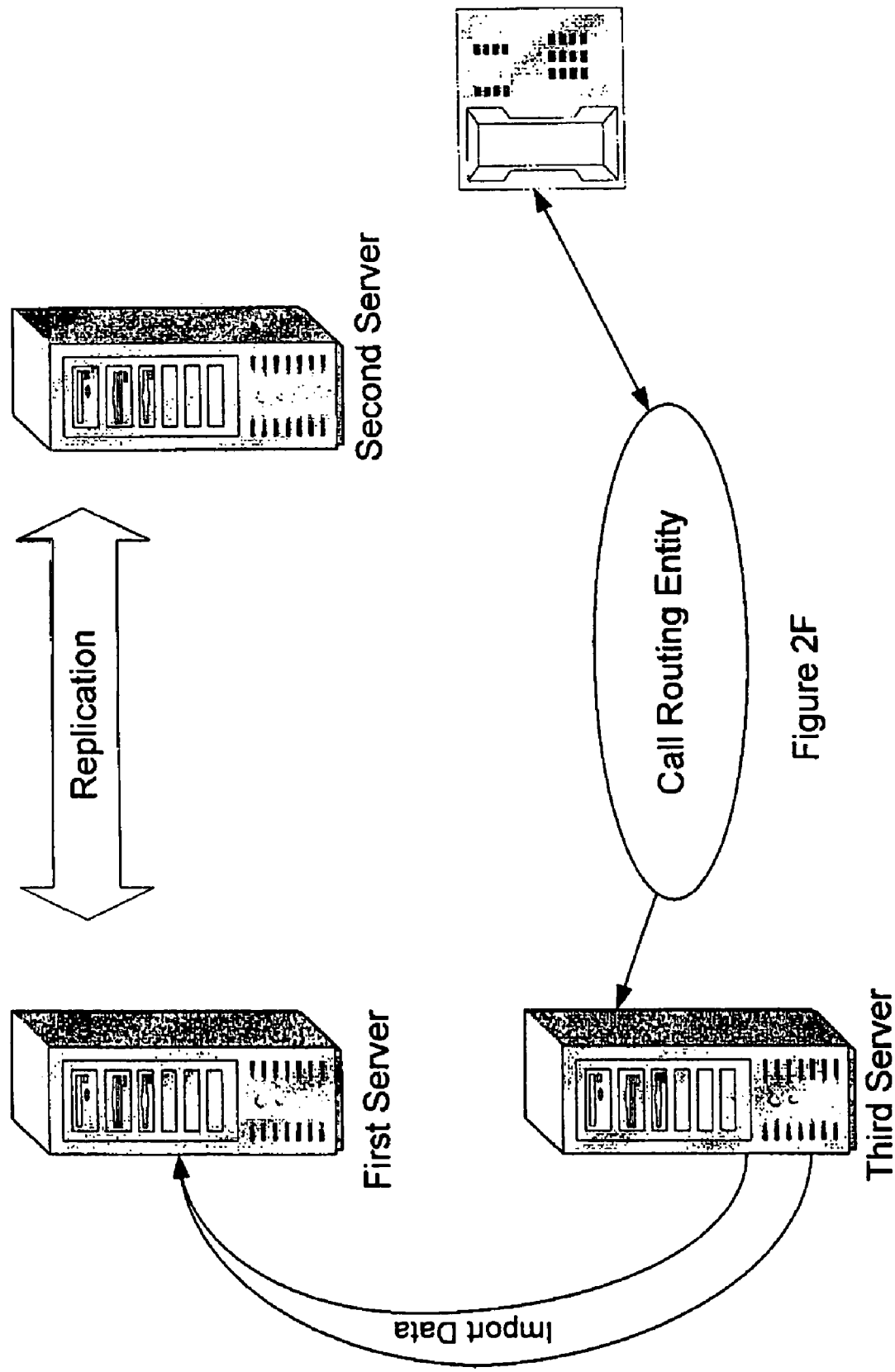

FIG. 2F illustrates the next stage of the upgrade process, where data is imported from the third server 130 back into the first server 110, which is now upgraded. In accordance with the exemplary embodiment, a small amount of new data may accumulate on the third server 130 while the first and second servers 110, 120 are offline and being upgraded. The new data might be related to call processing events that occurred while the first and second servers 110, 120 were offline. Thus, the new data is imported into the first server 110, and the first server 110 in turn replicates that data to the second server 120.

Figure 2G:
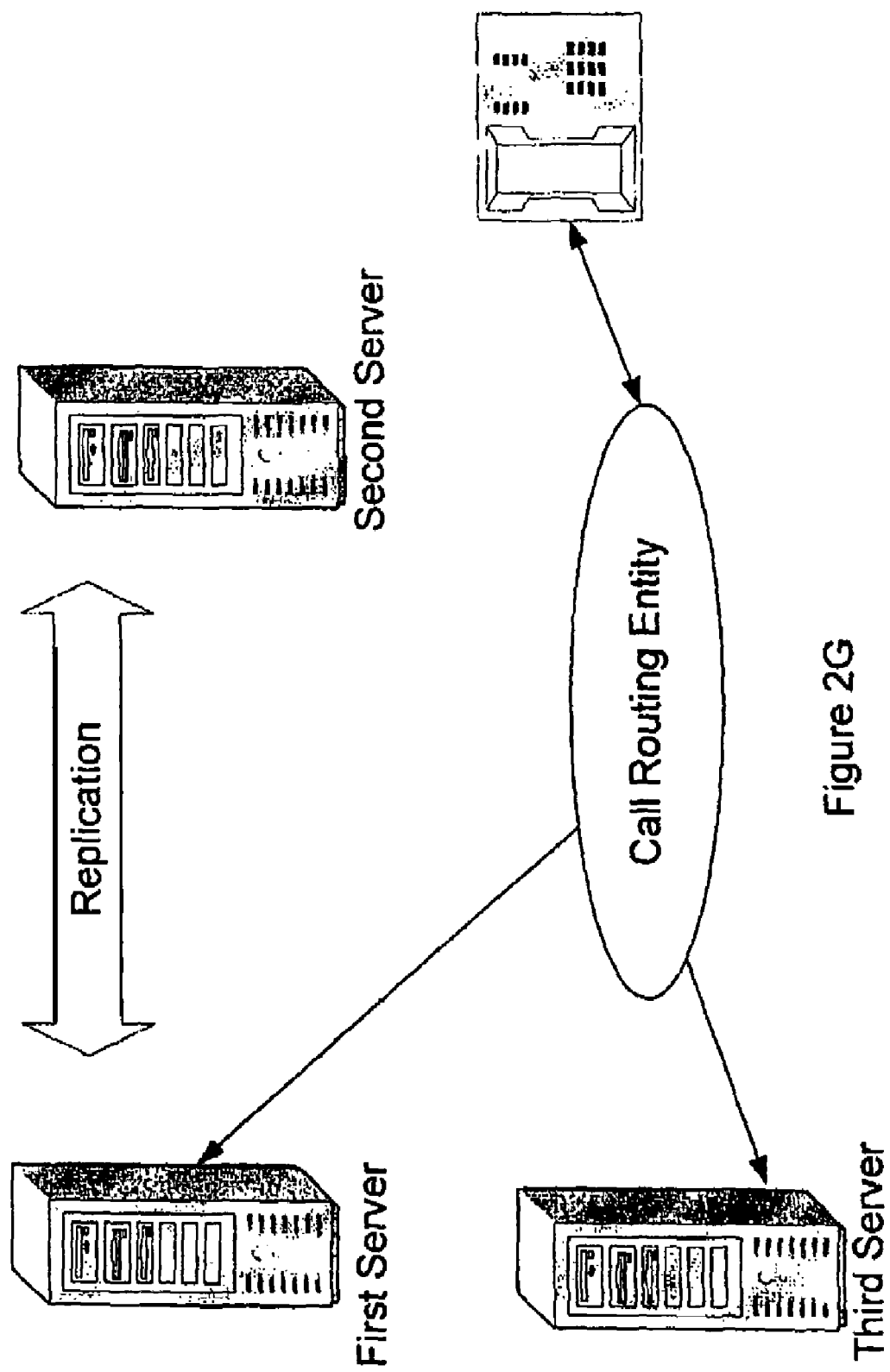

At this stage, the call routing entity 140 is still routing all calls coming into the system 100 to the third server 130. The third server 130, however, is not upgraded and still running the original system version, version A. Thereafter, as illustrated in FIG. 2G, the call routing entity 140 switches to using the first server 110 as the primary call routing server. Thus, incoming calls are now primarily routed to the first server 110 instead of to the third server 130. The call routing entity 140 continues to use the third server 130 as the secondary call routing server. Thus, in the event of a failure of the first server 110, the call routing entity 140 would route calls to the third server 130.

Since the first server 110 was just upgraded, switching to the first server 110 as the primary server and keeping the third server 130 as the secondary server provides a period of time to test the integrity and operation of the first server 110. In the event that the upgrade causes a fault on the first server, the call routing entity 140 then routes calls to the third server 130, which has the prior version of the software and presumably would not suffer from the same fault as just occurred on the first server 110. If the second server 120 were operating as the secondary server at this point in time, and a fault occurred on the first server 110 due to the upgrade, it is likely that the same fault might occur on the second server 120 due to the upgrade, thereby bringing the entire system down.

Once the integrity and operation of the first server 110 has been satisfactorily tested, the secondary call routing address can be switched from the third server 130 to the second server 120, thereby taking the third server out of the system. If the first server 110 is not operating properly, the system can be switched back to the third server 130 thereby allowing the first server to be fixed or alternatively restored to the prior version of the software. Alternatively, the first server 110 may be fixed while it is still online. If the first server 110 is operating properly, then at this point the system 100 is upgraded and all its original connections are restored, as illustrated in FIG. 2A.

It should be understood that the programs, processes, methods and apparatus described herein are not related or limited to any particular type of computer or network apparatus (hardware or software), unless indicated otherwise. Various types of general purpose or specialized computer apparatus may be used with or perform operations in accordance with the teachings described herein. While various elements of the preferred embodiments have been described as being implemented in software, in other embodiments hardware or firmware implementations may alternatively be used, and vice-versa.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more, fewer or other elements may be used in the block diagrams.

The claims should not be read as limited to the described order or elements unless stated to that effect. In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

We claim:

1. A method for upgrading a system, the method comprising:

ceasing to route user sessions from a call routing entity to any one of a first server and a second server, wherein the call routing entity is in communication with the first server and the second server;

importing data from the first server to a third server, wherein the first server, the second server, and the third server are of a current version, and wherein a replication application is maintained between the first server and the second server;

terminating the communication of the call routing entity with the second server and the first server, and enabling routing of user sessions to the third server by engaging the call routing entity in communication with the third server;

upgrading the first server and the second server while running the current version of the third server;

importing data from the third server into the first server; and terminating the communication of the call routing entity with the third server, and enabling routing of user sessions to the first server and the second server by engaging the call routing entity in communication with the first server and the second server.

2. The method of claim 1, wherein the call routing entity routes server traffic.

3. The method of claim 1, wherein the call routing entity operates externally to each of the first server, second server, and the third server.

4. The method of claim 1, wherein upgrading the first server and the second server further comprises testing the first server and the second server.

5. The method of claim 1, wherein importing data from the third server into the first server further comprising importing data accumulated on the third server while the first server and the second server were being upgraded.

6. The method of claim 1, wherein the replication application replicates data between at least two servers.

7. A method for upgrading a system, the method comprising:

importing data from a first server to a third server while the first server and a second server operate online in the system, wherein the first server, the second server, and the third server are of a current version, and wherein a replication application is maintained between the first server and the second server;

stopping online operation of the first server and the second server;

upgrading the first server and the second server while running the current version of the third server;

importing data from the third server to the first server; and restarting online operation of the first server and the second server.

8. The method of claim 7 further comprising switching a cell routing entity from communication with the first server and the second server to communication with the third server.

9. The method of claim 8, wherein the call routing entity routes server traffic.

10. The method of claim 8, wherein the call routing entity operates externally to each of the first server, second server, and the third server.

11. The method of claim 10, wherein the replication application replicates data between at least two servers.

12. The method of claim 7, wherein upgrading the first server and the second server further comprises testing the first server and the second server.

13. The method of claim 7, wherein importing data from the third server into the first server further comprises importing data accumulated on the third server while the first server and the second server were being upgraded.

14. A method for performing a live upgrade of first and second servers from a first software version to a second software version, the first server operating as a primary server in a real-time system and the second server operating as a backup server in the real-time system, and the first server replicating real-time data to the second server during real-time operation of the real-time system, the method comprising:

stopping operation of interfaces to a database in the first server;

exporting real-time data from the first server to a third server, wherein the third server operates as a backup server during the live upgrade, and wherein the third server runs the first version of the software;

switching to using a different server as the backup server, wherein the different server is not the first server and is not the second server;

switching to using the third server as the primary server instead of the first server;

stopping processes executing on the first and second servers;

upgrading the first and second servers from the first software version to the second software version;

restarting the processes on the first and second servers;

exporting real-time data from the third server to the first server;

switching to using the first server as the primary server instead of the third server; and switching to using the second server as the backup server instead of the different server.

15. The method of claim 14, wherein switching to using the different server as the backup server comprises switching to using the third server as the backup server.

16. The method of claim 14, where switching to using the different server as the backup server comprises switching to using a fourth server as the backup server.

17. The method of claim 14, further comprising validating the second version of the software on the first server before the step of switching to using the first server as the primary server instead of the third server.

18. The method of claim 14, wherein the real-time system is a real-time call processing system.

19. The method of claim 14, wherein exporting data from the third server to the first server comprises exporting data that has changed since the step of exporting data from the first server to the third server.

20. The method of claim 14, upgrading the first and second servers comprises backing up the first and second servers prior to upgrading software versions.

21. A system comprising:

a first server in communication with a second server, wherein the first server and the second server operate in a pre-upgraded state, and wherein the first server runs a replication application that maintains the same data on the first server and the second server;

a third server into which the first server imports data prior to the first server being upgraded, wherein, while the first server is subsequently being upgraded, the third server operates in the pre-upgraded state in place of the first server to receive system traffic and process data; and a call routing entity that routes system traffic to a server.

22. The system of claim 21, wherein the replication application replicates data between the first and second servers.

* * * * *